United States Patent [19]

Gardner

[11] 4,394,301

[45] Jul. 19, 1983

[54] CATALYTIC HYDROCRACKING, HYDRODESULFURIZATION, AND/OR HYDRODENITROGENATION OF ORGANIC COMPOUNDS EMPLOYING PROMOTED ZINC TITANATE AND A ZEOLITE AS THE CATALYTIC AGENT

[75] Inventor: Lloyd E. Gardner, Bartlesville, Okla.

[73] Assignee: Phillips Petroleum Company, Bartlesville, Okla.

[21] Appl. No.: 340,148

[22] Filed: Jan. 18, 1982

Related U.S. Application Data

[62] Division of Ser. No. 145,639, May 1, 1980, Pat. No. 4,324,647.

[51] Int. Cl.³ .......................... B01J 29/10; B01J 29/16
[52] U.S. Cl. ................................ 252/455 Z; 252/439
[58] Field of Search ................... 252/455 Z, 475, 469, 252/439

[56] References Cited

U.S. PATENT DOCUMENTS

| | | | |
|---|---|---|---|
| 3,006,863 | 10/1961 | Castor | 252/455 Z |
| 3,013,984 | 12/1961 | Breck | 252/455 Z |
| 3,098,032 | 7/1963 | Gladrow et al. | 252/455 Z |
| 3,331,767 | 7/1967 | Arey, Jr. et al. | 252/455 Z |
| 3,392,106 | 7/1968 | Mason et al. | 252/455 Z |
| 3,928,233 | 12/1975 | Young | 252/455 Z |
| 4,218,346 | 8/1980 | Walker et al. | 252/475 |

Primary Examiner—Carl F. Dees

[57] ABSTRACT

The catalytic hydrocracking, hydrodesulfurization, and/or hydrodenitrogenation of organic compounds is carried out in the presence of a catalyst composition comprising zeolite, zinc, titanium, and at least one promoter selected from the group consisting of vanadium, chromium, cobalt, nickel, molybdenum, tungsten, rhenium, platinum, palladium, rhodium, ruthenium and compounds thereof.

14 Claims, No Drawings

CATALYTIC HYDROCRACKING, HYDRODESULFURIZATION, AND/OR HYDRODENITROGENATION OF ORGANIC COMPOUNDS EMPLOYING PROMOTED ZINC TITANATE AND A ZEOLITE AS THE CATALYTIC AGENT

This application is a division of application Ser. No. 145,639, filed May 1, 1980, now U.S. Pat. No. 4,324,647.

This invention relates to a process for hydrocracking a feedstock which contains at least one hydrocrackable organic compound and a catalyst therefor. In another aspect, this invention relates to a process for the hydrodesulfurization of organic sulfur compounds or hydrodenitrogenation of organic nitrogen compounds, and a catalyst therefor. In still another aspect, this invention relates to a one-stage process for hydrocracking a feedstock which contains at least one hydrocrackable organic compound, for hydrodesulfurizing any organic sulfur compounds and for hydrodenitrogenating any organic nitrogen compounds contained in the feedstock, and a catalyst therefor.

Hydrodesulfurization is a process intended primarily to convert the sulfur in organic sulfur compounds to hydrogen sulfide. Hydrodenitrogenation is a process intended primarily to convert the nitrogen in organic nitrogen compounds to ammonia. Hydrodensulfurization and hydrodenitrogenation will generally occur at the same time under similar process conditions if both organic sulfur compounds and organic nitrogen compounds are present in the feed stream. The hydrogen sulfide and/or ammonia can be removed from the feed stream after the hydrodesulfurization and/or hydrodenitrogenation process. Hydrodesulfurization and hydrodenitrogenation are processes which are typically utilized to remove sulfur and nitrogen from a hydrocarbon-containing feedstock which also contains organic sulfur compounds and/or organic nitrogen compounds to produce fuels which, when burned, will meet environmental standards. The processes may be applied to feed streams other than hydrocarbon-containing feeds if organic sulfur compounds and/or organic nitrogen compounds are present and the removal of sulfur and/or nitrogen is desired.

Hydrocracking refers to the process of breaking carbon-carbon bonds in the presence of hydrogen. The most general application of hydrocracking is to convert gas oils to gasoline. However hydrocracking can be utilized to convert naphtha to liquefied petroleum gas, convert residuum to a distillate, etc.

Usually the feed for a hydrocracking process must first be passed through a hydrodesulfurization and/or hydrodenitrogenation process to remove sulfur and nitrogen to avoid poisoning the hydrocracking catalyst. Obviously, it would be desirable to avoid a two-stage process if catalyst poisoning could be avoided.

It is thus an object of this invention to provide a one-stage process for hydrocracking a feedstock which contains at least one hydrocrackable organic compound, for hydrodesulfurizing any organic sulfur compounds contained in the feedstock, and for hydrodenitrogenating any organic nitrogen compounds contained in the feedstock. It is a further object of this invention to provide a catalyst composition which is useful for hydrocracking, hydrodesulfurization, and/or hydrodenitrogenation.

In accordance with the present invention, a catalyst composition comprising zeolite, zinc, titanium and a promoter is utilized as a catalyst for a hydrocracking process, hydrodesulfurization process and/or hydrodenitrogenation process. The promoter is at least one member selected from the group consisting of vanadium, chromium, cobalt, nickel, molybdenun, tungsten, rhenium, platinum, palladium, rhodium, ruthenium, and compounds thereof.

The catalyst composition is extremely resistant to poisoning by ammonia or hydrogen sulfide. The catalyst composition also exhibits a low coke formation rate which allows the use of long process cycles without regeneration and low operating temperatures.

The catalyst composition may be utilized for hydrocracking only, if no organic sulfur compounds or organic nitrogen compounds are present in the feedstock. The catalyst composition may be utilized only for hydrodesulfurization and/or hydrodenitrogenation if desired. While the invention is particularly directed towards hydrocarbon-containing feedstreams, organic sulfur compounds and/or organic nitrogen compounds contained in any suitable gaseous stream may be hydrodesulfurized and/or hydrodenitrogenated in accordance with the present invention. Thus, while preferably the catalyst composition of the present invention is utilized in a hydrocracking process in which it is also desired to hydrodesulfurize organic sulfur compounds or hydrodenitrogenate organic nitrogen compounds, the catalyst composition of the present invention is also applicable to hydrocracking, hydrodesulfurization, or hydrodenitrogenation singly, or in any combination.

Other objects and advantages of the invention will be apparent from the foregoing brief description of the invention and the appended claims, as well as from the detailed description of the invention which follows.

Any suitable hydrocarbon containing feedstream can be hydrocracked in accordance with the present invention. Feedstreams which are considered to be advantageously and efficiently hydrocracked in accordance with the process of this invention include petroleum products and products from extraction and/or liquefaction of coal and lignite, products from tar sands, products from shale oil and similar products. Suitable hydrocarbons include naphtha, distillates, gas oil having a boiling range from about 205° to about 538° C., topped crude having a boiling range in excess of about 343° C. and residuum. In general, residuum and topped crude may be hydrocracked to produce a distillate or a naphtha while gas oils are generally hydrocracked to produce gasoline range materials and naphtha and distillates are hydrocracked to produce LPG.

Organic sulfur compounds and/or organic nitrogen compounds contained in the hydrocarbon-containing feedstreams which are being hydrocracked may be hydrodesulfurized and/or hydrodenitrogenated in accordance with the present invention. It is again noted that while the invention is particularly directed to hydrocarbon-containing feedstreams which also contain organic sulfur compounds and/or organic nitrogen compounds, the invention is applicable to hydrocarbon-containing feedstreams which do not contain organic sulfur compounds and/or organic nitrogen compounds. The invention is also applicable to hydrodesulfurizing organic sulfur compounds and/or hydrodenitrogenating organic nitrogen compounds contained in any suitable fluid stream. Suitable fluid streams include not only the hydrocarbon-containing feeds previously mentioned but also include light hydrocarbons such as methane, ethane, ethylene and natural gas, gases such as hydrogen and nitrogen, gaseous oxides of carbon, steam, and the inert gases such as helium and argon.

Any suitable organic sulfur compound can be hydrodesulfurized in accordance with the present invention. Suitable organic sulfur compounds include sulfides, disulfides, mercaptans, thiophenes, benzothiophenes, dibenzothiophenes and the like and mixtures of any two or more thereof.

Any suitable organic nitrogen compound can be hydrodenitrogenated in accordance with the present invention. Suitable organic nitrogen compounds include amines, diamines, pyridines, quinolines, porphyrins, benzoquinolines and the like and mixtures of any two or more thereof.

The catalyst employed in the process of the present invention is a composition comprising zeolite, zinc, titanium and a promoter. At least one member of the promoter is selected from the group consisting of vanadium, chromium, cobalt, nickel, molybdenum, tungsten, rhenium, platinum, palladium, rhodium, ruthenium, and compounds thereof. The preferred promoters are cobalt, nickel, molybdenum, tungsten and rhenium. The promoting elements are generally present on the catalyst as the oxide or the sulfide except for platinum which will generally be present as the element. The zinc and titanium are generally present as zinc titanate.

The zinc titanate portion of the catalyst composition may be prepared by intimately mixing suitable portions of zinc oxide and titanium dioxide, preferably in a liquid such as water, and calcining the resulting mixture in a gas containing molecular oxygen at a temperature in the range of about 650° C. to about 1050° C., preferably in the range of about 675° C. to about 975° C. A calcining temperature in the range of about 800° C. to about 850° C. is most preferred because the surface area of the catalyst is maximized in this temperature range thus producing a more active catalyst. The titanium dioxide used in preparing the zinc titanate preferably has extremely fine particle size to promote intimate mixing of the zinc oxide and titanium dioxide. This produces a rapid reaction of the zinc oxide and titanium dioxide which results in a more active catalyst. Preferably the titanium dioxide has an average particle size of less than 100 millimicrons and more preferably less than 30 millimicrons. Flame hydrolyzed titanium dioxide has extremely small particle size and is particularly preferred in preparing the catalyst. The atomic ratio of zinc to titanium can be any suitable ratio. The atomic ratio of zinc to titanium will generally lie in the range of about 1:1 to about 3:1 and will preferably lie in the range of about 1.8:1 to about 2.2:1 because the activity of the catalyst is greatest for atomic ratios of zinc to titanium in this range. The term "zinc titanate" is used regardless of the atomic ratio of zinc to titanium.

The zinc titanate portion of the catalyst composition may also be prepared by coprecipitation from aqueous solutions of a zinc compound and a titanium compound. The aqueous solutions are mixed together and the hydroxides are precipitated by the addition of an alkali metal hydroxide. The precipitate is then washed, dried and calcined, as described in the preceding paragraph, to form zinc titanate. This method of preparation is less preferred than the mixing method because the zinc titanate prepared by the coprecipitation method is softer than the zinc titanate prepared by the mixing method.

The promoter, at least one member of which is selected from the group consisting of vanadium, chromium, cobalt, nickel, molybdenum, tungsten, rhenium, platinum, palladium, rhodium, ruthenium and compounds thereof, is generally present on the catalyst in the oxide or sulfide form except for platinum which will generally be present in the elemental form. The promoter can be added to the zinc titanate by any method known in the art. The promoter can be added to the zinc titanate as powdered oxide and dispersed by any method known in the art such as rolling, shaking or stirring. For ease of preparation, the preferred method of adding the promoter is by impregnating the preformed zinc titanate with a solution of a compound of the promoting element that becomes converted to the oxide during the subsequent preparation of the catalyst. The impregnated catalyst is dried to remove solvent and is then heated in the presence of molecular oxygen at a temperature in the range of about 500° C. to about 650° C., preferably about 540° C. If more than one of the promoting elements is to be used in the catalyst composition, the catalyst composition is preferably dried and calcined after each addition of a promoting element.

The concentration of the promoter can be any suitable concentration. The concentration of the total promoter, expressed as an element, will generally range from about 0.1 to about 24 weight percent based on the weight of the catalyst composition. The concentration of the vanadium, chromium, cobalt, nickel, molybdenum, or tungsten as individual promoting elements, expressed as an element, if present, will preferably be in the range of about 0.1 to about 16 weight percent based on the weight of the catalyst composition and will more preferably be in the range of about 1.6 to about 8 weight percent. The concentration of rhenium, palladium, rhodium, ruthenium or platinum as individual promoting elements, expressed as the element, if present, will preferably be in the range of about 0.2 to about 1.6 weight percent.

Either of the elemental form of the promoters or any suitable compound of the promoters may be used to form the catalyst composition.

Vanadium compounds suitable for use as a promoter include di-, tri-, tetra-, and pentavalent vanadium oxides, vanadium (III) sulfide, vanadium (IV) oxide sulfate, ammonium metavanadate, sodium metavanadate, and the like and mixtures of any two or more thereof.

Chromium compounds suitable for use as a promoter include ammonium chromate and ammonium dichromate, chromic nitrate, chromium (III) oxide, chromium (VI) oxide, chromic sulfate, potassium chromate and potassium dichromate, chromic acetate, and the like and mixtures of any two or more thereof.

Cobalt compounds suitable for use as a promoter include cobalt acetate, cobalt carbonate, cobalt nitrate, cobalt oxide, cobalt sulfate, cobalt thiocyanate, and the like and mixtures of any two or more thereof.

Nickel compounds suitable for use as a promoter include nickel acetate, nickel carbonate, nickel nitrate, nickel oxide, nickel sulfate, ammonium nickel sulfate, nickel sulfamate, and the like and mixtures of any two or more thereof.

Molybdenum compounds suitable for use as a promoter include ammonium molybdate, ammonium heptamolybdate, molybdenum oxides such as molybdenum (IV) oxide and molybdenum (VI) oxide, molybdenum sulfide, and the like and mixtures of any two or more thereof.

Tungsten compounds suitable for use as a promoter include ammonium tungstates such as ammonium metatungstate and ammonium paratungstate, tungsten oxides such as tungsten (IV) oxide and tungsten (VI) oxide, tungsten sulfides such as tungsten (IV) sulfide and tungsten (VI) sulfide, heteropoly acids such as tungstophosphoric acid and tungstosilicic acid, and the like and mixtures of any two or more thereof.

Rhenium compounds suitable for use as a promoter include perrhenic acid, ammonium perrhenate, rhenium oxides such as rhenium (VI) oxide and rhenium (VII) oxide, rhenium sulfide, and the like and mixtures of any two or more thereof.

Platinum compounds suitable for use as a promoter include dihydrogen hexachloroplatinate, diamineplatinum (II) nitrate, tetraamineplatinum (II) nitrate, and the like and mixtures of any two or more thereof.

Ruthenium, rhodium, and palladium nitrates are a suitable form for the addition of these elements as catalyst promoters.

Halogen-containing compounds of the promoting elements can be used as promoters. However, the user should be aware of the possibility of corrosion caused by their presence.

Any suitable zeolite may be utilized in the catalyst composition. The preferred zeolite is a Y-type zeolite which has a low sodium content preferably not greater than about 0.5 weight percent and more preferably not greater than about 0.2 weight percent. Linde LZ-Y82, a zeolite commercially available from the Linde Division of Union Carbide Corporation, is a suitable zeolite. Y-type zeolites and removal of sodium are described in the Kirk-Othmer Encyclopedia of Chemical Technology, Second Edition, Volume 18, pages 157–158.

The zeolite may be present in the catalyst composition in any suitable concentration. Preferably, the concentration of the zeolite will be in the range from about 1 to about 60 weight percent of the total catalyst composition and will more preferably be in the range of about 10 to about 40 weight percent of the total catalyst composition.

Preferably, the promoter is added to the zinc titanate prior to combining the promoted zinc titanate with the zeolite. The promoted zinc titanate may be combined with the zeolite in any suitable manner. One method of combining the promoted zinc titanate with the zeolite is to mix the solid powders and then add sufficient distilled water to produce a slurry. The resulting slurry is dried and then calcined in the presence of molecular oxygen at a temperature in the range of about 500° C. to about 650° C., preferably about 540° C., for two or more hours. The thus calcined material may be pilled, extruded, or crushed and screened to an appropriate size.

The most preferred catalyst composition comprises a low sodium Y-type zeolite, zinc titanate, cobalt and molybdenum. The concentration of the low sodium Y-type zeolite in the preferred catalyst composition is in the range of about 10 to about 40 weight percent. The atomic ratio of cobalt to molybdenum in the preferred catalyst composition is in the range of about 0.6:1 to about 0.8:1.

The catalyst may become sulfided during the hydrocracking process if organic sulfur compounds or hydrogen sulfide is present in the feedstream or may be presulfided. The catalyst is preferably presulfided even if the catalyst is to be used only for hydrocracking or hydrodenitrogenation. The presulfiding of the catalyst is preferred before the catalyst is initially used and after each regeneration of the catalyst. Preferably, the catalyst is presulfided in two steps. The catalyst is first treated with a mixture of hydrogen sulfide in hydrogen at a temperature in the range of about 175° C. to about 225° C., preferably about 205° C. The temperature in the catalyst composition will rise during this first presulfiding step and the first presulfiding step is continued until the temperature rise in the catalyst has substantially stopped or until hydrogen sulfide is detected in the effluent flowing from the reactor. The mixture of hydrogen sulfide and hydrogen preferably contains in the range of about 5 to about 20 mole percent hydrogen sulfide, preferably about 10 mole percent hydrogen sulfide.

The second step in the presulfiding process consists of repeating the first step at a temperature in the range of about 350° C. to about 400° C., preferably about 370° C. It is noted that other mixtures containing hydrogen sulfide or other sulfur-containing compounds may be utilized to presulfide the catalyst. Also the use of hydrogen sulfide is not required. In a commercial operation, it is common to utilize a light naphtha containing sulfur to presulfide the catalyst.

The pre-sulfided form is the most active state of the catalyst. However, since the zinc titanate portion of the catalyst becomes sulfided up to about 25 weight percent of the zinc titanate, the presulfiding time as described above might be too lengthy to be practical in a commercial operation. An alternative method is sulfiding with the feed to be processed at mild conditions where coke formation on the catalyst is minimal. The feed is preferably recycled until the desired sulfur content is reached, and the gaseous effluent containing hydrogen sulfide is also recycled. When the desired catalyst activity is reached the recycle operation is discontinued.

The process of this invention can be carried out by means of any apparatus whereby there is achieved a contact with the catalyst of the organic compounds to be hydrocracked, hydrodesulfurized and/or hydrodenitrogenated. The process is in no way limited to the use of a particular apparatus. The process of this invention can be carried out using a fixed catalyst bed, fluidized catalyst bed, or moving catalyst bed. Presently preferred is a fixed catalyst bed.

Any suitable temperature for hydrocracking, hydrodesulfurization and/or hydrodenitrogenation over the catalyst composition of the present invention can be utilized. The temperature will generally be in the range of about 260° C. to about 482° C. and will more preferably be in the range of about 316° C. to about 399° C. In the upper end of the preferred range (about 371° C. to about 399° C.), hydrocracking, hydrodenitrogenation and hydrodesulfurization all occur at a high level. In the lower end of the preferred range (about 316° C. to about 343° C.) hydrodenitrogenation occurs at a high level, hydrodesulfurization occurs at a moderate level, and hydrocracking occurs at a low level.

Any suitable pressure for the hydrocracking, hydrodesulfurization and/or hydrodenitrogenation process over the catalyst composition of the present invention can be utilized. In general, the pressure will be in the range of about 200 to about 2500 psig total system pressure for the process. The total system pressure is the sum of the partial pressure of the feedstock plus the partial pressure of the added hydrogen. Preferably, the total system pressure will range from about 500 to about 1500 psig for the process.

Any suitable quantity of hydrogen can be added to the hydrocracking, hydrodesulfurization and/or hydrodenitrogenation process. The quantity of hydrogen used to contact the feedstock being hydrocracked, hydrodesulfurized and/or hydrodenitrogenated in terms of standard cubic feet (SCF/barrel (bbl)) will be in the range of about 100 to about 10,000 SCF/bbl, and will more preferably be in the range of about 500 to about 3000 SCF/bbl.

Any suitable residence time for the feedstock in the presence of the catalyst composition of the present invention can be utilized. In general, the residence time in terms of liquid hourly space velocity, i.e. the volumes of liquid per volume of catalyst per hour (LHSV), can range from about 0.1 to about 10 and will more preferably range from about 0.5 to about 3.

To maintain the activity of the catalyst composition, the process temperature is generally gradually increased to compensate for loss of catalyst activity due to fouling of the catalyst. When the temperature of the process cannot conveniently be increased further, the catalyst is typically regenerated by terminating the flow of feed to the reactor, purging with an inert fluid such as nitrogen to remove combustibles and then introducing a free oxygen-containing fluid to oxidize the carbonaceous deposits which have formed on the catalyst during the process. The catalyst will generally be utilized for a year or longer before being regenerated but may have to be regenerated sooner if a particularly heavy feedstock is being hydrocracked.

Any suitable purge time may be utilized. The purge duration will generally be of sufficient duration to remove all hydrocarbons and hydrogen from the system. Any suitable flow rate of the purge gas may be utilized. Presently preferred is a purge fluid flow rate in terms of gas hourly space velocity (GHSV) in the range of about 800 GHSV to about 1200 GHSV.

The amount of oxygen, from any source, supplied during the regeneration step, will be sufficient to remove carbonaceous materials from the catalyst and will preferably be in 1-5 mol percent concentration. The regeneration step is conducted at generally the same pressure recited for the hydrocracking, hydrodesulfurization and/or hydrodenitrogenation process but can be carried out at lower pressure if desired. The temperature for the regeneration step is preferably maintained in the range of about 425° C. to about 540° C. in order to remove any cabonaceous deposits on the catalyst within a reasonable time, although the temperature can be as high as 620° C. Regeneration will also partially convert the sulfided catalyst to the oxide form and the presulfiding step is preferably repeated.

Any suitable time for the regeneration of the catalyst composition can be utilized. The regeneration effluent should be substantially free of carbon dioxide at the end of the regeneration period.

The following examples are presented in further illustration of the invention.

EXAMPLE I

Zinc titanate was prepared by combining Mallinckrodt zinc oxide with Cab-O-Ti titanium dioxide in water and mixing for 10 minutes in a blender. The resulting slurry was dried in an oven at 105° C. and then calcined by heating in air at 816° C. for three hours. After cooling, the calcined solid was crushed and screened. A <40 mesh portion of the thus screened zinc titanate was utilized to prepare catalyst A. The atomic ratio of zinc to titanium in the zinc titanate was 1.8:1.

Cobalt and molybdenum promoters were added to the thus prepared zinc titanate by first covering the zinc titanate was an aqueous solution of cobalt as Co(NO$_3$)$_2$.6H$_2$O. After standing one hour at 25° C., excess solution was removed by decanting or filtering and the wet zinc titanate was dried with occasional stirring. The thus dried zinc titanate was calcined in air in a muffle furnace for 3-4 hours at 538° C. and cooled in a dessicator. The cobalt promoted zinc titanate was then covered with an aqueous solution of molybdenum as (NH$_4$)$_6$Mo$_7$O$_{24}$.4H$_2$O. After standing one hour at 25° C., excess solution was removed by decanting and the wet promoted zinc titanate was dried with occasional stirring. The thus dried zinc titanate promoted with cobalt and molybdenum was calcined in air in a muffle furnace for 3-4 hours at 538° C. and cooled in a dessicator.

The resulting cobalt and molybdenum promoted zinc titanate was combined with Linde zeolite LZ-Y82 (a type Y zeolite) by slurrying the cobalt and molybdenum-promoted zinc titanate and the Linde zeolite LZ-Y82 in distilled water. The resulting slurry was dried and heated to 1000° F. The thus dried combination of zeolite, zinc titanate, cobalt and molybdenum was then crushed and screen to 16-40 mesh size and hereinafter is designated as catalyst A.

An analysis of catalyst A is as follows: bulk density 0.75 3 g/cc; surface area 49.5 m$^2$/g; wt. % Zn 44.2; wt. % Ti 17.2; wt. % CoO 0.51; wt. % MoO$_3$ 1.56. The wt. % Y zeolite was calculated to be 14.22. X-ray diffraction showed the major zinc component present to be zinc titanate. ZnO and ZnTiO$_3$ were also present in minor amounts.

The hydrodesulfurization and hydrodenitrogenation activity of catalyst A was compared with Shell 344, which is a commercial cobalt molybdate/alumina hydrotreating catalyst. Analysis of Shell 344 is as follows: bulk density, 0.79 g/cc; pore volume, 0.5 cc/g; surface area 186 m$^2$/g; wt. % CoO, 2.99; wt. % MoO$_3$ 14.42. For the comparison the feedstock was a blend of a 70 percent straight run distillate and a 30 percent light cycle oil. The feedstock had a boiling range of 99°-382° C., contained 0.75 weight percent sulfur and 187 parts per million nitrogen. The comparison was made using a 316 stainless steel reactor having a 1-inch outside diameter, a 0.8-inch inside diameter and a length of 5 inches. Catalyst volume in the reactor was 10 cc diluted with inert alundum to make 25 cc total volume. The feedstock was fed to the reactor at a rate of 2.5 LHSV. Hydrogen was fed to the reactor at a rate of 5000 standard cubic feet/bbl. The reaction effluent passed from the reactor to a high pressure liquid-vapor separator. Total system pressure in the reactor was 500 psig.

Prior to testing the catalyst, the reactor containing the catalyst was purged with an inert gas and the catalyst was pretreated with the feedstock for a time sufficient fo the catalyst to become sulfided. After the catalyst in the reactor had been presulfided, a temperature survey was made in the sequence of 750°, 800°, 600°, 650°, 700°, and 750° F. During the temperature survey, liquid product was removed from the high pressure liquid-vapor separator for analysis for sulfur, nitrogen, carbon, hydrogen and hydrocarbon type.

Both hydrogen sulfide and ammonia were removed from the liquid product prior to analysis for sulfur and nitrogen by a caustic wash (10% KOH). The analysis for sulfur was done by X-ray fluorescence. The analysis for nitrogen was carried out by chemiluminescence techniques. A standard combustion analysis was utilized to analyze for carbon and hydrogen. A mass spectrometer structural analysis was utilized to analyze for hydrocarbon type.

Table I summarizes test results for the comparison of catalyst A and Shell 344:

TABLE I

| Temp. (°F.) | % HDS Catalyst A | % HDS Shell-344 | % HDN Catalyst A | % HDN Shell-344 |
|---|---|---|---|---|
| 600 (346° C.) | 55.3 | 90.7 | 99.5 | 82.2 |
| 650 (343° C.) | 81.3 | 96.0 | 100 | 73.4 |
| 700 (371° C.) | 98.4 | 97.3 | 100 | 71.0 |
| 750 (399° C.) | 97.5 | 98.8 | 100 | 74.3 |
| 800 (427° C.) | 97.9 | 97.3 | 100 | 82.7 |

Table I illustrates that catalyst A was superior to Shell 344 for hydrodenitrogenation at all temperatures and closely corresponded to the hydrodesulfurization activity of Shell 344 at the higher temperatures tested.

EXAMPLE II

The hydrocracking activity of catalyst A was illustrated using the reactor, feedstock and process conditions of Example I. A time survey was made at 650° F. and 750° F. Prior to the time survey of 650° F., catalyst A was presulfided by exposing catalyst A to the feedstock at a flow rate of 2.5 LHSV and a temperature of 750° F. for about 18 hours.

TABLE II

| | Reactor Temp. 650° F. (343° C.) | | | Reactor Temp. 750° F. (399° C.) | | | Feed |
|---|---|---|---|---|---|---|---|
| Time on stream (hrs.)* | 26 | 56 | 94 | 35 | 62 | 100 | |
| Conv. of 400° F.+ (204° C.) Feed (wt. %) | 31.0 | 20.3 | 8.2 | 87.6 | 67.9 | 73.7 | |
| Conv. of 500° F.+ (204° C.) Feed (wt. %) | 43.9 | 31.4 | 23.4 | 92.1 | 78.3 | 87.9 | |
| % HDS | 81.3 | 65.3 | 64.4 | 97.5 | 94.9 | 98.0 | |
| % HDN | 100 | 100 | 100 | 100 | 100 | 100 | |
| Yields (wt. %)** | | | | | | | |
| C₁-C₄ (Gas product) | 9.7 | 9.4 | 3.7 | 33.3 | 17.1 | 25.4 | 0 |
| C₅-400° F. (204° C.) gasoline } Liquid | 33.6 | 23.8 | 20.1 | 56.4 | 56.0 | 58.2 | 17.1 |
| 400° F.+ (204° C.) } Product | 56.6 | 66.8 | 76.2 | 9.9 | 26.9 | 16.4 | 82.9 |
| Liquid Product | | | | | | | |
| S (wt. %) | 0.140 | 0.260 | 0.267 | 0.019 | 0.038 | 0.015 | 0.75 |
| N (ppm) | 0 | 0 | 0 | 0 | 0 | 0 | 187 |
| °API₆₀ | 43.7 | 40.1 | 39.7 | 59.8 | 52.6 | 56.6 | 36.1 |
| % C | 86.33 | 86.40 | — | 86.24 | 86.37 | 86.81 | 86.41 |
| % H | 13.36 | 13.25 | — | 13.03 | 13.18 | 13.26 | 12.93 |
| Paraffin | 39.6 | 36.3 | — | 42.4 | 43.2 | — | 35.1 |
| Naphthenes | 33.2 | 34.8 | — | 23.4 | 28.0 | — | 33.9 |
| Aromatics | 27.2 | 28.9 | — | 32.4 | 28.8 | — | 31.0 |

*Catalyst was presulfided by 18 hours exposure to feed at 2.5 LHSV at 750° F.
**Calculated on an H₂S free basis.

Significant hydrocracking activity is indicated by the conversion of the 500° F. and 400° F. fractions to lower boiling materials. Hydrodesulfurization activity and hydrodenitrogenation activity are indicated by the %HDS, %HDN, lower wt % of sulfur and lower parts per million of nitrogen.

EXAMPLE III

Linde zeolite LZ-Y82 was impregnated with an aqueous solution of molybdenum as $(NH_4)_6Mo_7O_{24} \cdot 4H_2O$ and an aqueous solution of cobalt as $Co(NO_3)_2 \cdot 6H_2O$ at the same time. The thus impregnated Linde zeolite 33-200 was then dried and calcined in air at a temperature of 1000° F. The resulting cobalt and molybdenum promoted zeolite is designated hereinafter as catalyst B. The weight percent of cobalt as cobalt oxide was 1.8 while the weight percent of molybdenum as molybdenum oxide was 6.3.

Catalyst A and B were compared using the reactor, feedstock and process conditions of Example I. Table III indicates that the presence of the zinc titanate generally improved hydrodesulfurization and hydrodenitrogenation and also provided on improved hydrocracking catalyst.

TABLE III

| | Catalyst A | | | Catalyst B | | | Feed |
|---|---|---|---|---|---|---|---|
| Reactor Temp. (°F.) | 750 | 650 | 750 | 750 | 650 | 750 | |
| Time on stream (hrs) | 23 | 32 | 58 | 23 | 32 | 58 | |
| Conv. of 400° F.+ (204° C.) (wt. %) | 73.7 | 5.6 | 24.5 | 58.6 | 4.1 | 19.2 | |
| Conv. of 500° F.+ (260° C.) (wt. %) | 87.9 | 22.5 | 32.1 | 76.3 | 18.8 | 40.2 | |
| % HDS | 98.0 | 64.4 | 73.9 | 92.0 | 55.2 | 70.8 | |
| % HDN | 100 | 100 | 100 | 100 | 93.0 | 95.7 | |
| Yields (wt. %)* | | | | | | | |
| C₁-C₄ (gas product) | 25.4 | 3.4 | 7.1 | 27.1 | 2.3 | 8.5 | 0 |
| C₅-400° F. gasoline | 58.2 | 20.1 | 24.8 | 47.6 | 19.2 | 31.0 | 16.2 |
| 400° F.+ Liquid Product | 16.4 | 76.2 | 68.1 | 25.3 | 78.5 | 54.8 | 83.8 |
| S (wt. %) | 0.015 | 0.267 | 0.196 | 0.082 | 0.336 | 0.219 | 0.75 |
| N (ppm) | 0 | 0 | 0 | 0 | 13 | 8 | 187 |
| °API₆₀ | 56.6 | 39.7 | 41.7 | 50.6 | 38.6 | 42.6 | 36.1 |
| % C | 86.81 | — | — | 87.16 | — | — | 86.91 |
| % H | 13.26 | — | — | 13.02 | — | — | 12.93 |
| Paraffin | — | — | — | 43.7 | — | — | 35.1 |
| Naphthenes | — | — | — | 21.1 | — | — | 33.9 |
| Aromatics | — | — | — | 35.1 | — | — | 31.0 |

*Calculated on an H₂S free basis.

EXAMPLE IV

Zinc titanate was prepared by combining Mallinckrodt zinc oxide with Degussa flame hydrolyzed titanium dioxide in water and mixing for 10 minutes in a blender. The resulting slurry was dried in an oven at 105° C. and then calcined by heating in air at 816° C. for three hours. After cooling, the calcined solid was crushed and screened. A <40 mesh portion of the thus screened zinc titanate was utilized to prepare catalyst C. The atomic ratio of zinc to titanium in the zinc titanate was 1.8:1.

Cobalt and molybdenum promoters were added to the thus prepared zinc titanate by first covering the zinc titanate with an aqueous solution of cobalt as Co(NO$_3$)$_2$.6H$_2$O. After standing one hour at 25° C., excess solution was removed by decanting or filtering and the wet zinc titanate was dried with occasional stirring. The thus dried zinc titanate was calcined in air in a muffle furnace for 3-4 hours at 538° C. and cooled in a dessicator. The cobalt promoted zinc titanate was then covered with an aqueous solution of molybdenum as (NH$_4$)$_6$Mo$_7$O$_{24}$.4H$_2$O. After standing one hour at 25° C., excess solution was removed by decanting and the wet promoted zinc titanate was dried with occasional stirring. The thus dried zinc titanate promoted with cobalt and molybdenum was calcined in air in a muffle furnace for 3-4 hours at 538° C. and cooled in a dessicator.

The resulting cobalt and molybdenum promoted zinc titanate was combined with Linde zeolite LZ-Y82 by slurrying the cobalt and molybdenum-promoted zinc titanate and the Linde zeolite LZ-Y82 in distilled water. The resulting slurry was dried and heated to 1000° F. The thus dried combination of zeolite, zinc titanate, cobalt and molybdenum was then crushed and screened to 16-40 mesh size.

The fines left after screening the resulting zeolite, zinc titanate, cobalt and molybdenum catalyst composition were slurried with additional Linde YZ-Y82 zeolite. The resulting slurry was dried and heat calcined in air for about 4 hours at 1000° F. The resulting calcined composition was crushed and screened to give 10-30 mesh particles and is hereinafter designated as catalyst C. Catalyst C contained 37 weight percent zeolite which was a significantly larger concentration of zeolite than was present in catalyst A. The surface area of catalyst C was 200 m$^2$/g; the wt % CoO was 2.7 and the wt % MoO$_3$ was 2.6.

Catalyst C was tested using the reactor, feedstock, and process conditions in Example I. A time survey was made at 750° F. The results of the test are presented in Table IV.

TABLE IV

| | Reactor temp. (°F.) | | | |
|---|---|---|---|---|
| | 750 (399° C.) | 750 | 750 | FEED |
| Time on stream (hrs)* | 17 | 70 | 166 | |
| Conv. of 500° F.+ (wt. %) | 70.2 | 54.3 | 55.6 | |
| % HDS | 86.8 | 85.5 | 78.5 | |
| % HDN | 100 | 100 | 100 | |
| Yields (wt. %)** | | | | |
| C$_1$-C$_4$ (gas product) | 10.4 | 16.1 | 12.6 | 0 |
| C$_5$-400° F. gasoline | 50.0 | 35.2 | 36.7 | 13.2 |
| 400° F.+ | 39.6 | 48.7 | 50.7 | 86.8 |
| Liquid Product | | | | |
| S (wt. %) | 0.099 | 0.109 | 0.161 | 0.75 |
| N (ppm) | 0 | 1 | 0 | 222 |
| °API$_{60}$ | 48.7 | 48.7 | 45.1 | 36.1 |

*catalyst not presulfided
**calculated on an H$_2$S free basis

Comparing the data of Table IV to the data of Table III catalyst A at 23 and 58 hours showed 87.9% and 32.1% conversion of the 500° F.+ fraction respectively while catalyst C at 17 and 70 hours showed 70.2% and 54.3% conversion of the 500° F.+ respectively. This, while catalyst C is initially not as active as catalyst A, catalyst C maintained higher activity over a longer period of time. This illustrates that the higher zeolite content in catalyst C imparts longer life to the catalyst.

Reasonable variations and modifications are possible within the scope of the disclosure and the appended claims to the invention.

That which is claimed is:

1. A catalyst composition comprising zeolite, zinc, titanium, and at least one promoter selected from the group consisting of vanadium, chromium, cobalt, nickel, molybdenum, tungsten, rhenium, platinum, palladium, rhodium, ruthenium, and compounds thereof.

2. A composition in accordance with claim 1 wherein said zinc and titanium are present in said catalyst composition in the form of zinc titanate prepared by calcining a mixture of zinc oxide and titanium dioxide in the presence of molecular oxygen at a temperature in the range of about 650° C. to about 1050° C.

3. A composition in accordance with claim 2 wherein the atomic rato of zinc to titanium in said catalyst composition is in the range of about 1:1 to about 3:1.

4. A composition in accordance with claim 2 wherein the atomic ratio of zinc to titanium in said catalyst composition is in the range of about 1.8:1 to about 2.2:1.

5. A composition in accordance with claim 1 wherein the concentration of said zeolite is in the range of about 1 to about 60 weight percent based on the weight of said catalyst composition.

6. A composition in accordance with claim 1 wherein the concentration of said zeolite is in the range of about 10 to about 40 weight percent based on the weight of said catalyst composition.

7. A composition in accordance with claim 1 wherein said zeolite is a Y-type zeolite having a sodium content not greater than about 0.5 weight percent.

8. A composition in accordance with claim 1 wherein said zeolite is a Y-type zeolite having a sodium content not greater than about 0.2 weight percent.

9. A composition in accordance with claim 1 wherein the concentration of vanadium, chromium, cobalt, nickel, molybdenum, or tungsten as individual promoters, expressed as an element, if present, is in the range of about 0.1 to about 16 weight percent based on the weight of said catalyst composition and the concentration of rhenium, palladium, rhodium, ruthenium or platinum as individual promoters, expressed as the element, if present, is in the range of about 0.2 to about 1.6 weight percent based on the weight of said catalyst composition.

10. A composition in accordance with claim 9 wherein the total concentration of any combination of the group from which said at least one promoter is selected, expressed as an element, is in the range of about 0.1 to about 24 weight percent based on the weight of said catalyst composition.

11. A composition in accordance with claim 10 wherein said catalyst composition has been calcined in the presence of molecular oxygen at a temperature in the range of about 500° C. to about 650° C.

12. A composition in accordance with claim 1 wherein said at least one promoter is cobalt and molybdenum.

13. A composition in accordance with claim 12 wherein the cobalt:molybdenum atomic ratio in said catalyst composition is in the range of about 0.6:1 to about 0.8:1.

14. A composition in accordance with claim 1 wherein said catalyst composition is completely sulfided.

* * * * *